United States Patent [19]
Maue et al.

[11] Patent Number: 5,916,327
[45] Date of Patent: Jun. 29, 1999

[54] MULTI-FUNCTIONAL APPARATUS EMPLOYING AN ELECTROMAGNETIC DEVICE

[75] Inventors: H. Winston Maue, Farmington Hills; Eric J. Krupp, Canton, both of Mich.

[73] Assignee: UT Automotive Dearborn, Inc., Dearborn, Mich.

[21] Appl. No.: 08/948,168

[22] Filed: Oct. 9, 1997

Related U.S. Application Data

[63] Continuation-in-part of application No. 08/431,148, Apr. 28, 1995, Pat. No. 5,694,812.

[51] Int. Cl.$^6$ ........................................................ G05G 9/06
[52] U.S. Cl. .................................. 74/471 R; 15/250.001; 292/DIG. 25
[58] Field of Search ................... 74/471 R; 292/DIG. 25; 192/69.8, 69.82, 89.21; 15/250.001, 250.16, 250.17, 250.18

[56] References Cited

U.S. PATENT DOCUMENTS

| | | |
|---|---|---|
| 2,271,207 | 1/1942 | Rhein . |
| 2,345,778 | 4/1944 | Lammeren et al. . |

(List continued on next page.)

FOREIGN PATENT DOCUMENTS

| | | |
|---|---|---|
| 0 345 002 A2 | 6/1989 | European Pat. Off. . |
| 1281424 | 12/1961 | France . |
| 822 178 | 11/1951 | Germany . |
| 28 16 207 A1 | 10/1979 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 4/1993 | Japan . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Mulitplexed Node", Feb., 1996, H. Winston Maue, pp. 73–76.

"Goodheart–Wilcox Automotive Encyclopedia", William K. Toboldt, Larry Johnson, Steven W. Olive, 1989, pp. 723–727.

"Automotive Handbook", Bosch 3rd Edition, 1993, pp. 694–697.

"Kinematic Analysis of Mechanisms", 1959, J.E. Shigley, pp. 228–231.

"Genevamation Indexing Drives", Jan. 12, 1995 Catalog No. 693, Geneva Mechanisms Corporation.

"Saab 900 Owners Workshop Manual", Haynes Publishing Group, 1979 through 1985, pp. 172–174, 237.

Machine Design, "Basics of Design Engineering", Jun. 1992, Article "Mechanical Systems".

(List continued on next page.)

Primary Examiner—John A. Jeffery
Assistant Examiner—David Fenstermacher
Attorney, Agent, or Firm—Harness, Dickey & Pierce, P.L.C.

[57] ABSTRACT

A multi-functional apparatus employs an electromagnetic device. The electromagnetic device selectively causes movement of an intermittent motion mechanism thereby moving a mechanical device coupled thereto. A main driving gear is rotated from the wiper positional range in either direction to access one or another adjacent release positional range, but not necessarily both at the same time.

16 Claims, 13 Drawing Sheets

U.S. PATENT DOCUMENTS

| | | |
|---|---|---|
| 2,615,945 | 10/1952 | Jaeschke . |
| 2,659,237 | 11/1953 | Wood . |
| 2,722,617 | 11/1955 | Cluwen et al. . |
| 2,953,802 | 9/1960 | Ziegler . |
| 2,959,803 | 11/1960 | Ziegler . |
| 3,163,791 | 12/1964 | Carlson . |
| 3,361,005 | 1/1968 | Carpenter . |
| 3,361,947 | 1/1968 | Schlebusch . |
| 3,421,380 | 1/1969 | Mansour . |
| 3,442,146 | 5/1969 | Simpson . |
| 3,443,442 | 5/1969 | Schweihs . |
| 3,443,455 | 5/1969 | Zugel . |
| 3,516,610 | 6/1970 | Stevens . |
| 3,523,204 | 8/1970 | Rand . |
| 3,574,882 | 4/1971 | Petry . |
| 3,619,676 | 11/1971 | Kawakami . |
| 3,659,128 | 4/1972 | Danek . |
| 3,665,772 | 5/1972 | Beard et al. . |
| 3,688,332 | 9/1972 | Bellware . |
| 3,689,817 | 9/1972 | Elliott . |
| 3,694,723 | 9/1972 | Schneider et al. . |
| 3,705,520 | 12/1972 | Carpenter . |
| 3,803,627 | 4/1974 | Schuscheng . |
| 3,858,922 | 1/1975 | Yamanaka . |
| 3,917,330 | 11/1975 | Quantz . |
| 3,927,436 | 12/1975 | Inoue et al. . |
| 4,009,952 | 3/1977 | Badalich et al. . |
| 4,065,234 | 12/1977 | Yoshiyuki et al. . |
| 4,158,159 | 6/1979 | Orris et al. . |
| 4,173,055 | 11/1979 | Izumi et al. . |
| 4,183,114 | 1/1980 | Eden . |
| 4,259,624 | 3/1981 | Seibicke . |
| 4,271,381 | 6/1981 | Munz et al. . |
| 4,309,646 | 1/1982 | Liedtke et al. . |
| 4,336,482 | 6/1982 | Goertler et al. . |
| 4,352,299 | 10/1982 | Riggs et al. . |
| 4,422,522 | 12/1983 | Slavin et al. . |
| 4,434,678 | 3/1984 | Maus . |
| 4,450,390 | 5/1984 | Andrei-Alexandru et al. . |
| 4,478,004 | 10/1984 | Andrei-Alexandru et al. . |
| 4,492,904 | 1/1985 | Graham . |
| 4,507,711 | 3/1985 | Ono et al. . |
| 4,553,656 | 11/1985 | Lense . |
| 4,573,723 | 3/1986 | Morita et al. . |
| 4,630,178 | 12/1986 | Mugford et al. . |
| 4,639,065 | 1/1987 | Kohler et al. . |
| 4,660,698 | 4/1987 | Miura . |
| 4,674,781 | 6/1987 | Reece et al. . |
| 4,701,972 | 10/1987 | Saito . |
| 4,702,117 | 10/1987 | Tsutsumi et al. . |
| 4,724,760 | 2/1988 | Bubley . |
| 4,733,147 | 3/1988 | Muller et al. . |
| 4,793,640 | 12/1988 | Stewart, Sr. . |
| 4,875,053 | 10/1989 | Harada . |
| 4,878,398 | 11/1989 | Heinrich . |
| 4,885,512 | 12/1989 | Gille et al. . |
| 4,893,039 | 1/1990 | Isii . |
| 4,918,272 | 4/1990 | Nishikawa . |
| 5,007,131 | 4/1991 | Chevalier et al. . |
| 5,023,530 | 6/1991 | Ohashi et al. . |
| 5,045,741 | 9/1991 | Dvorsky . |
| 5,063,317 | 11/1991 | Bruhn . |
| 5,182,957 | 2/1993 | Bohmer et al. . |
| 5,214,440 | 5/1993 | Takahashi et al. . |
| 5,218,255 | 6/1993 | Horiguchi . |
| 5,222,775 | 6/1993 | Kato . |
| 5,228,239 | 7/1993 | Heo . |
| 5,251,114 | 10/1993 | Cantin et al. . |
| 5,274,875 | 1/1994 | Chou . |
| 5,291,109 | 3/1994 | Peter . |
| 5,315,735 | 5/1994 | I-Shin . |
| 5,333,351 | 8/1994 | Sato . |
| 5,355,061 | 10/1994 | Forhan . |
| 5,355,286 | 10/1994 | Flint . |
| 5,373,605 | 12/1994 | Austin . |
| 5,427,345 | 6/1995 | Yamakami et al. . |
| 5,462,337 | 10/1995 | Yamakami . |
| 5,519,258 | 5/1996 | Stroven et al. . |
| 5,528,959 | 6/1996 | Yamakami . |
| 5,545,184 | 8/1996 | Dougherty . |
| 5,691,586 | 11/1997 | Yonnet et al. . |
| 5,694,812 | 12/1997 | Maue et al. . |
| 5,730,028 | 3/1998 | Maue et al. . |
| 5,844,382 | 12/1998 | Dan . |

OTHER PUBLICATIONS

A paper from the Third Conference on Mechanisms, "A Survey of Intermittent–Motion", F.J.Bogardus, 1956, pp. 8–15.

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

Machine Design, Mechanisms for Intermittent Motion, "Part 2", Jan. 1952, Otto Lichtwitz, pp. 127–141.

Machine Design, Mechanisms for Intermittent Motion, "Part 3", Feb. 1952, Otto Lichtwitz, pp. 146–155.

Machine Design, Mechanisms for Intermittent Motion, "Part 4", Mar. 1952, Otto Lichtwitz, pp. 147–155.

A paper from the Third Conference on Mechanisms, "Designing for Intermittent Motion with Modified Starwheels", Karl E. Kist, pp. 16–20.

"Mechanisms for Engineering Design"—"Motion, Circular, Intermittent", Charpter 3, S.B. Tuttle, John Wiley Co., pp. 33–51.

Machine Design, "Modifying Starwheel Mechanisms", Vandeman and Wood, Apr. 1953, pp. 255–261.

Journal of the American Ceramic Society, vol. 66, No. 11, pp. 801–807 (1983), Haussonne et al, "Barium Titanate Perovskite Sintered with Lithium Fluoride".

Journal of Materials Science, vol. 23, pp. 4481–4486 (1988), Laurent et al, "Sintering of Strontium Titanate in the Presence of Lithium Salts in a Reducing Atmosphere".

International Journal for Hybrid Microelectronics, vol. 10, No. 4, pp. 1–5 (1987), Fu et al, "Low Firing Z5U Dielectrics in the System Pb $(Fe_{2/3}W_{1/3})x(Fe_{1/2}Nb_{1/2})$ $0.9-xTi_{0.1}O_3-Bi_2O_3/Li_2O$".

Advanced Ceramic Materials, vol. 3, No. 1, pp. 32–37 (1988), Halmi et al, "Improved Lead Perovskite Compounds (PFM–PFT) for Z5U Capacitor Applications".

The Pennsylvania State University Graduate School, (Doctor of Philosophy Program), A Thesis in Solid State Science, pp. 1–239, (May 1991), Mohammed H. Megherhi, "Interaction Studies of Lead Magnesium Niobate–Based Capacitor Materials with Integrated Ceramic Packaging".

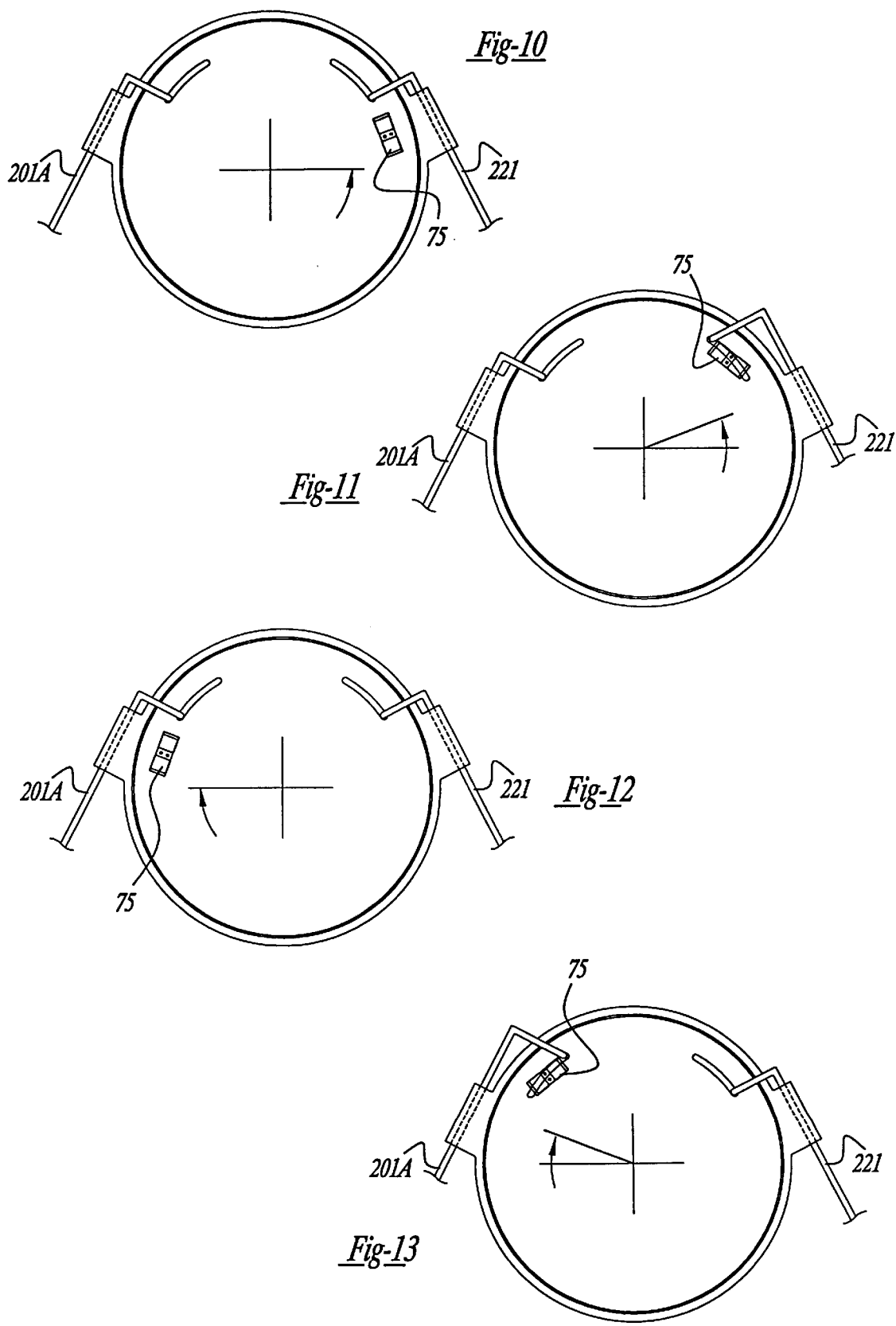

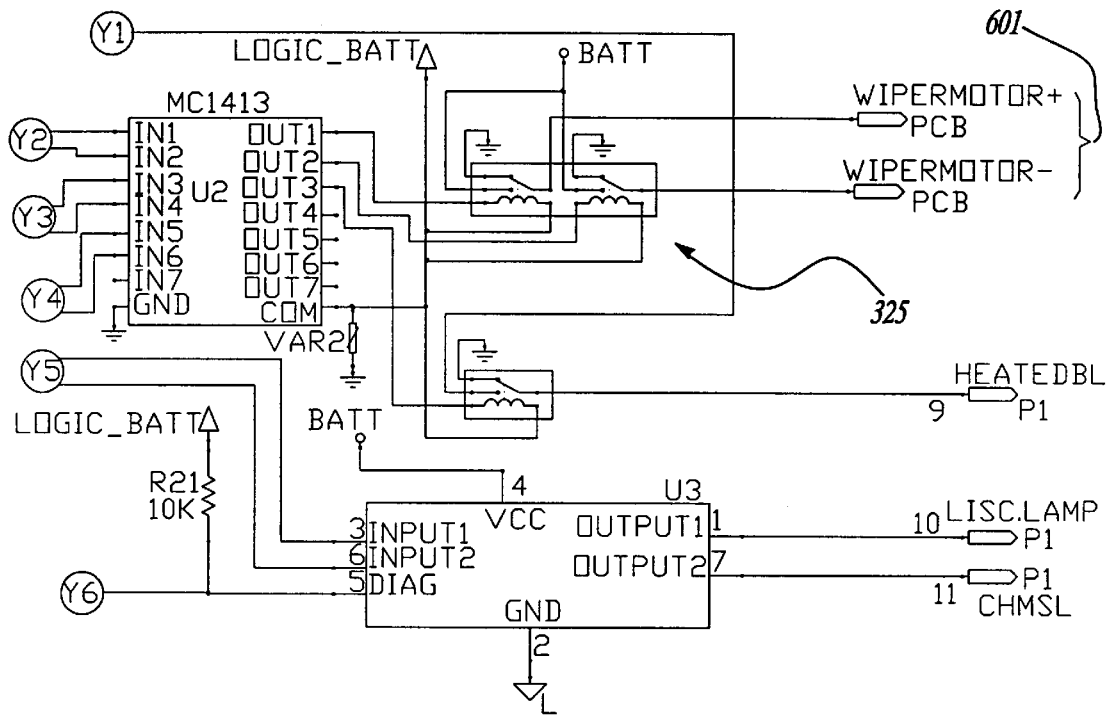
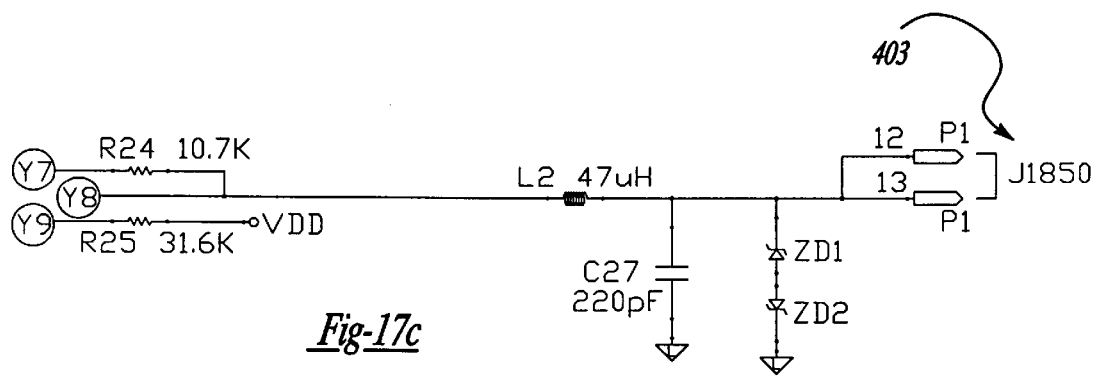
*Fig-17c*

MULTI-FUNCTIONAL APPARATUS EMPLOYING AN ELECTROMAGNETIC DEVICE

CROSS REFERENCE TO RELATED APPLICATIONS

This application is a continuation-in-part of co-pending U.S. patent application Ser. No. 08/431,148, filed Apr. 28, 1995, now U.S. Pat. No. 5,694,812.

BACKGROUND OF THE INVENTION

This invention relates generally to multi-functional apparatuses and specifically to a multi-functional apparatus employing an electromagnetic device for use in an automotive vehicle.

Almost all automotive vehicles have a single or a pair of windshield wiper assemblies. These assemblies traditionally include rubber wiper blades mounted upon claw brackets. These claw brackets are pivotably attached to wiper arms mounted upon rotating shafts. These shafts are either directly driven by electric motors or driven by a single electric motor which actuates series or parallel-coupled four-bar linkage mechanisms. It is further known to provide a wiper system, in combination with a wash device, to clean headlamps for automotive vehicles.

It is also common to employ a window wiper assembly for cleaning rear windows of automotive vehicles. Typically, these types of rear window wiper assemblies include a wiper blade mounted upon a bracket which is coupled to a wiper arm. The wiper arm is attached to a wiper shaft rotatably driven in a cyclical oscillating manner by a helical worm gear. A reversible, fractional horsepower, dc electric motor serves to actuate the helical gear through an armature shaft-mounted worm gear segment enmeshed therewith. This type of rear window wiper arrangement is usually mounted upon a pivoting liftgate of a minivan, station wagon, sport-utility vehicle or the like.

Examples of conventional window wiper assemblies and motor mechanisms are disclosed in the following U.S. Patents: U.S. Pat. No. 4,893,039 entitled "Windshield Wiper Motor" which issued to Isii on Jan. 9, 1990; U.S. Pat. No. 4,878,398 entitled "Driving Device for Window Wiper of Motor Vehicles" which issued to Heinrich on Nov. 7, 1989; U.S. Pat. No. 4,336,482 entitled "Rear Window Wiper Motor Control" which issued to Goertler et al. on Jun. 22, 1982; U.S. Pat. No. 4,259,624 entitled "Arrangement for Wiping a Vehicle Window" which issued to Seibicke on Mar. 31, 1981; U.S. Pat. No. 3,694,723 entitled "Motor Vehicle Windshield Wiper Having a Parking Position Outside the Wiper Area" which issued to Schneider et al. on Sep. 26, 1972; and, U.S. Pat. No. 3,665,772 entitled "Windshield Wiper Motor Link Depressed Park Mechanism" which issued to Beard et al. on May 30, 1972. All of these patents are incorporated by reference herein.

Some conventional vehicles also provide a rear window release lock or latch, actuated by a solenoid, which can be unlocked to allow for upward pivotal movement of the rear window in relation to the otherwise stationary liftgate. In combination therewith, a separate liftgate lock is often mounted upon the liftgate door for fastening the liftgate to the body to prevent inadvertent pivotal opening. This liftgate lock is traditionally operated by manual key or handle rotation, or through a separate electric motor or solenoid.

Additionally, separate motors or solenoids are required to actuate passenger door locks, an antenna retraction mechanism, headlamp cover retraction mechanisms, a fuel filler door lock and other similar functions. The traditional need for such a multiplicity of electromagnetic devices has increased the automotive vehicle weight and cost while further proving difficult to package within the often small spaces provided. This added weight is especially detrimental when the window wiper mechanism, rear window lock and liftgate lock, as well as their distinct respective electromagnetic devices, are all incorporated within the pivoting liftgate. Not only is the piece cost increased due to this multiplicity of electromagnetic devices, but the assembly cost, part number proliferation and handling costs, electrical wiring costs, objectional motor noise, and failure modes are increased.

Furthermore, U.S. Pat. No. 3,688,332 entitled "Mechanism for Opening and Closing a Cover for a Concealed Windshield Wiper System" which issued to Bellware on Sep. 5, 1972, discloses a windshield wiper driven by an electric motor and an interruptable driving connection controlled by a separate electromagnet. This device further employed levers and pivot pins to open and close a cover. DE 38 07 087 also discloses an electric motor which rotates various mechanisms to drive a rear window wiper and to unlock a rear door, however, the rear window is fixedly adhered to the door. Additionally, an electric motor which rotates and moves axially is disclosed in U.S. Pat. No. 5,045,741 entitled "Dual-Motion Apparatus" which issued to Dvorsky on Sep. 3, 1991, and is incorporated by reference herein.

SUMMARY OF THE INVENTION

In accordance with the present invention, the preferred embodiment of an improved multi-functional apparatus employs an electromagnetic device. The electromagnetic device selectively causes movement of an intermittent motion mechanism thereby moving a mechanical device coupled thereto. In another aspect of the present invention, a single electric motor selectively actuates three intermittent motion mechanisms thereby causing three mechanical devices coupled thereto to operate. In a further aspect of the present invention, a clutch mechanism selectively drives a window wiper. Still another aspect of the present invention sequentially rotates a main driving gear from a liftgate release positional range to a window wiper positional range to a subsequent liftglass release positional range, and alternately, vice versa. The main driving gear is rotated from the wiper positional range in either direction to access one or the other adjacent release positional range, but not necessarily both at the same time. A method for operating the multi-functional apparatus of the present invention is also provided.

The multi-functional apparatus of the present invention is advantageous over conventional systems since the present invention combines many different functions into a single apparatus. For example, the present invention multi-functional apparatus replaces the traditional separate rear wiper motor, liftgate release motor and rear window release solenoid. Accordingly, the present invention multi-functional apparatus significantly reduces the piece cost, assembly cost, part proliferation and handling costs, and wiring costs as compared to conventional constructions. Furthermore, the multi-functional apparatus of the present invention significantly reduces weight and packaging space requirements while increasing the electrical and mechanical reliability of the affected systems. Objectional motor and solenoid noises are also reduced. Moreover, a lost linkage mechanism is not necessary to allow for manual overriding of the motorized multi-functional apparatus of the present invention. The sequential positional ranges simplify the operation of the door lock mechanism compared to known devices thereby alleviating the need for a separate manual door latch handle in addition to a lock/unlock key mechanism; this provides an entirely automatic door unlatching system. Additional advantages and features of the present invention will become apparent from the following description and appended claims, taken in conjunction with the accompanying drawings.

BRIEF DESCRIPTION OF THE DRAWINGS

FIG. 10 is a diagrammatic rear view showing the first preferred embodiment of the present invention multi-functional apparatus at the beginning of a liftgate releasing movement;

FIG. 11 is a diagrammatic rear view showing the first preferred embodiment of the present invention multi-functional apparatus at the completion of the liftgate releasing movement;

FIG. 12 is a diagrammatic rear view showing the first preferred embodiment of the present invention multi-functional apparatus at the beginning of the liftglass releasing movement;

FIG. 13 is a diagrammatic rear view showing the first preferred embodiment of the present invention multi-functional apparatus at the completion of the liftglass releasing movement;

FIGS. 17a–17c are electrical schematic diagrams showing a rear node employed with the first preferred embodiment multi-functional apparatus of the present invention;

DETAILED DESCRIPTION OF THE PREFERRED EMBODIMENTS

Figure 1:
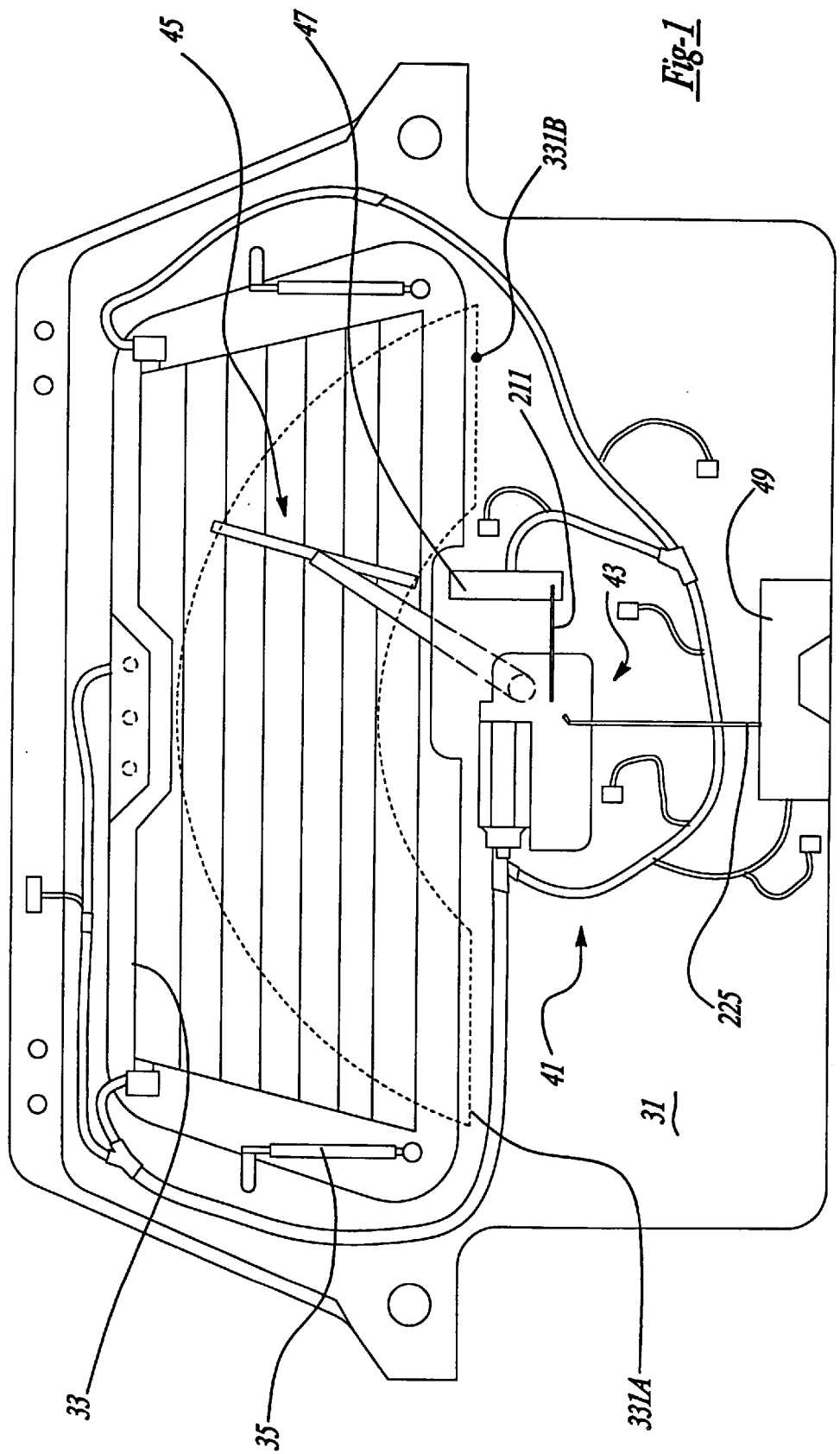
FIG. 1 is a front elevational view showing a first preferred embodiment of a multi-functional apparatus of the present invention.

An automotive vehicle, such as a minivan or the like, has a rear liftgate door which can pivot about an upper pair of hinges coupled to the vehicle body structure. When the liftgate is pivoted to an open position, a cargo space is accessible from behind the vehicle. Such a liftgate is shown in FIG. 1. Liftgate 31 has a rear window or backlite 33 pivotable between a closed position, generally flush with the outer surface of liftgate 31, to an open position about upper hinges. A pair of pneumatic cylinders 35 act to push window 33 toward the open position when a lower portion of window 33 is released.

A first preferred embodiment of a multi-functional apparatus 41 of the present invention is mounted upon an inner surface of liftgate 31. The majority of apparatus 41 is hidden by an interior trim panel (not shown). Apparatus 41 includes a central drive and power transmission unit 43, a window wiper assembly 45, a window release latch 47 and a liftgate rear door release latch 49, all of which are mounted upon liftgate 31. Liftgate latch 49 does not require a lock and unlock function but simply disengages a U-shaped or a roundhead on a stem-type striker mounted to the vehicle body thereby releasing or "popping open" the liftgate door. Examples of such latches (employing separate solenoids or motors, which would be removed in order to couple the latch mechanism for use with the present invention) are disclosed within the following U.S. patents: U.S. Pat. No. 5,222,775 entitled "Power Operated Latch Device for Automotive Back Door" which issued to Kato on Jun. 29, 1993; U.S. Pat. No. 4,422,522 entitled "Inertial Lock for Vehicle Door Latch" which issued to Slavin et al. on Dec. 27, 1983; and, U.S. Pat. No. 3,917,330 entitled "Electric Lock Release" which issued to Quantz on Nov. 4, 1975; all of which are incorporated by reference herewithin.

The construction of central drive and power transmission unit 43 is best illustrated in FIGS. 1–4 and 6. An electromagnetic device such as an electric motor 51 is of a conventional fractional horsepower, dc electromagnetic variety having a metallic motor housing within which are stationary permanent magnets, a rotatable armature with wire windings, a rotatable armature shaft 53 joined to the armature, a commutator electrically connected to the wire windings and rotatable with the armature shaft, a brush card assembly and various electronic components. It will be apparent to those skilled in the art that other electric motor constructions can readily be substituted for that shown. A worm gear segment 55 is provided upon a portion of armature shaft 53 extending beyond the motor housing.

A gear housing 57 is also provided for receiving worm gear segment 55 and the immediately adjacent portions of armature shaft 53. A main helical worm gear 59 is also housed and rotatably journalled within gear housing 57. A collar 61 stationarily extends from housing 57 co-axial with a rotational axis of helical gear 59. Gear housing 57 is preferably made from cast aluminum. Helical gear 59 has an external set of helically oriented teeth 71 for meshing with worm gear segment 55. Helical gear 59 further has an internally oriented set of splines 73. A double ended spring tab 75, having two flexible driving interface surfaces, is mounted upon an outer face 77 of helical gear 59 by a pair of rivets, screws, sonic welded pins, hot air cold upset pins, or the like. Spring tab 75 is preferably stamped spring steel. Other driving interface means may be employed such as an integrally molded finger, screw, rivet, compression spring, rib or other similar formations projecting from a face or peripheral portion thereof. Helical gear 59 is preferably injection molded from a polymeric material such as acetyl. An electrically conductive feedback disk 81 is retained to an inside face 83 of helical gear 59 through ultrasonically rolled welding or insert molding. Feedback disk 81 is comprised of a set of copper alloy or brass stamped contacts which are provided with differing conductive and nonconductive patterns depending on the specific positional ranges as will be discussed in greater detail hereinafter. An electronic control module housing 91 has an electronic control module shell section 93 and a gear cover section 95. A cylindrical spindle 97 projects from gear cover section 95.

An actuator shaft 99 has a spur gear segment 101 and a carrier segment 103 divided by an annular flange 105. Spur gear segment 101 has a set of splines 107 around an exterior peripheral surface thereof for longitudinally sliding along, while remaining enmeshed with splines 73 of helical gear 59. Spur gear segment 101 further has an internal cylindrical passageway 109 journalled upon spindle 97 of gear cover section 95. A stiff compression spring 111 is disposed between flange 105 and a hub of helical gear 59 for biasing actuator shaft 99 toward a driven window wiper shaft 121. Actuator shaft 99 additionally contains a cam follower 123 extending from a peripheral surface thereof. Cam follower 123 rotatably rides along a camming surface 125 within a stepped bore 127 of collar 61. Cam follower 123 has a full radius on its camming end. Use of a standard lubricant may be desired. A pair of triangular fingers 131, project from an edge of actuator shaft 99 so as to disengagably couple with matching receptacles 133 within wiper shaft 121. Wiper shaft 121 further has a distal end with threads 135, upon which is attached a wiper arm 137 and nut in a conventional manner. Wiper shaft 121 further has a circular brim 139 which provides a bearing surface upon a distal edge of collar 61. A cap 141 with an aperture therein serves to retain brim 139 against collar 61. Actuator shaft 99 and wiper shaft 121 comprise a "split shaft" construction that act in conjunction with camming surface 125 to define a clutch mechanism. Actuator shaft 99 is preferably powdered metal while wiper shaft 121 is made from cold rolled steel.

Figure 2:
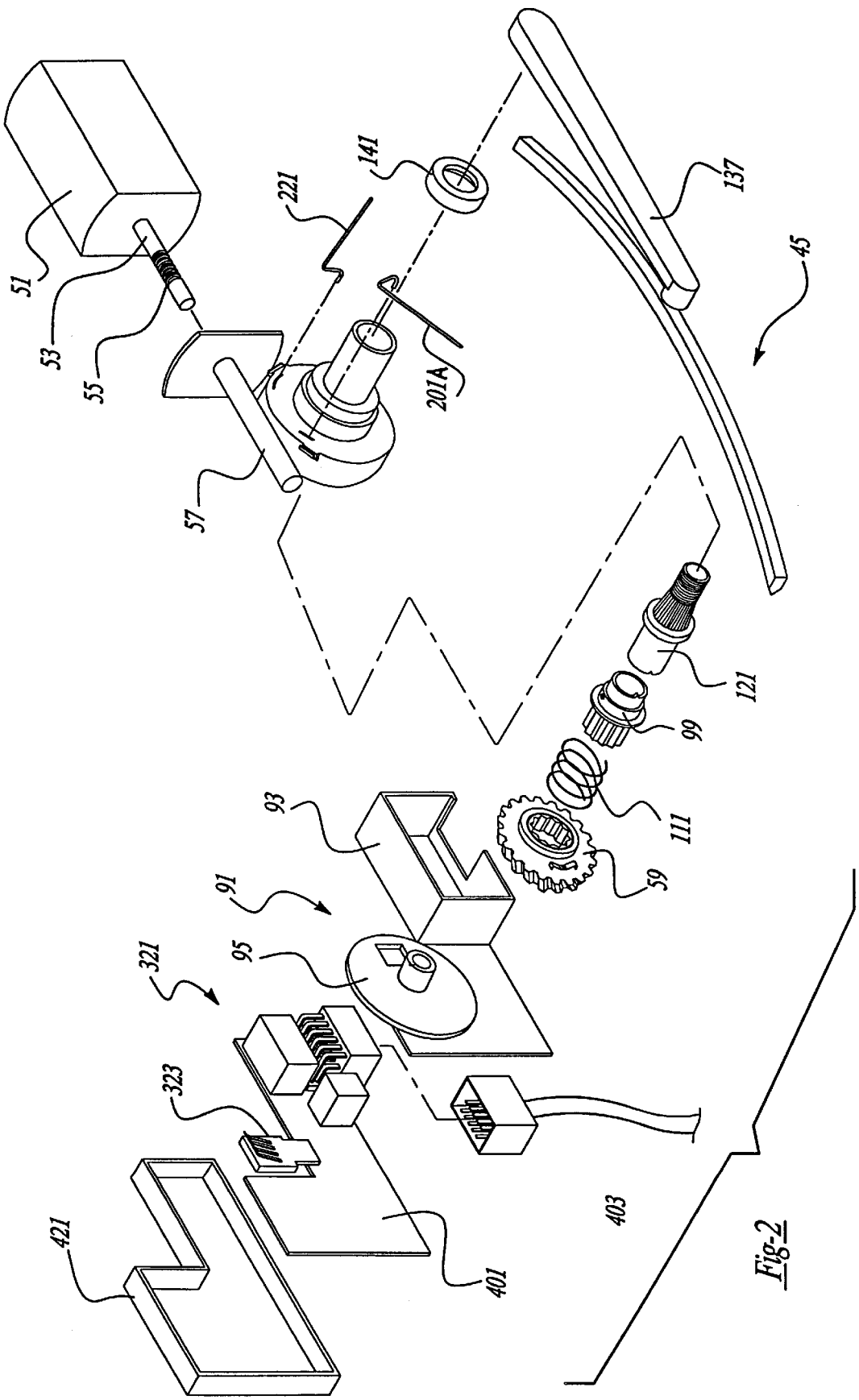
FIG. 2 is an exploded perspective view showing the first preferred embodiment multi-functional apparatus of the present invention.
Figure 4:
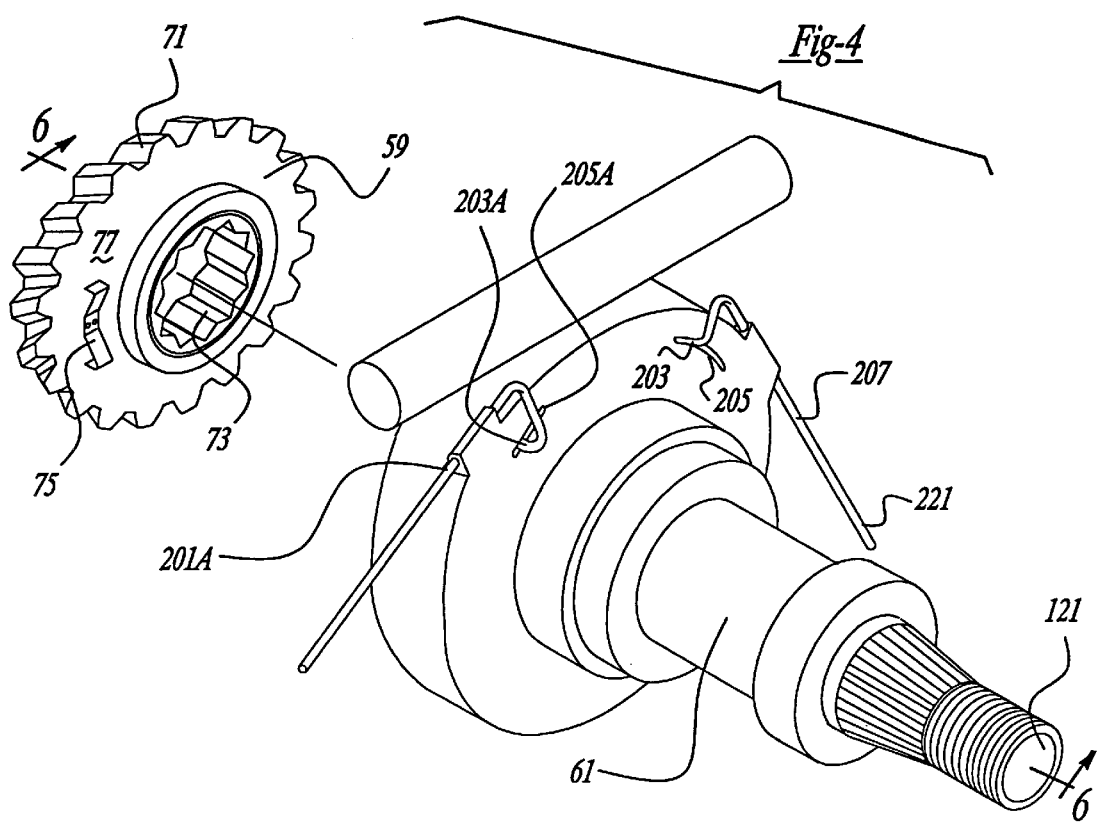
FIG. 4 is a perspective view, with a main gear exploded away therefrom and with an electric motor broken away therefrom, showing the first preferred embodiment multi-functional apparatus of the present invention.

Referring to FIGS. 1, 2 and 4, window latch 47 is actuated by an intermittent motion mechanism further defined as a liftgate window release latch linkage 221. Window linkage 221 is constructed from a steel wire. A leading end 203 of window linkage 221 is bent so as to extend through a slot 205 in gear housing 57. Furthermore, a median segment 207 of window linkage 221 is linearly slidable within a passageway formed through gear housing 57. A trailing end of window linkage 221 is coupled to a window lock connecting rod 211.

A door release latch linkage 201A is constructed like liftgate window release latch linkage 221 but in generally mirrored symmetry. Door release latch linkage 201A couples liftgate latch 49 to main helical gear 59 in an intermittent motion manner. Linkages 201A and 221 may alternately be constructed as pivoting or sliding members, having an infinite variety of shapes, and constructed from plastic, cast metal, powdered metal, bent wire, geared members or the like. It should further be understood that the connecting rods may be substituted by cables, belts, gears, a plurality of mechanical linkages, chains, jackscrews or other force transmitting and coupling means.

Figure 3:
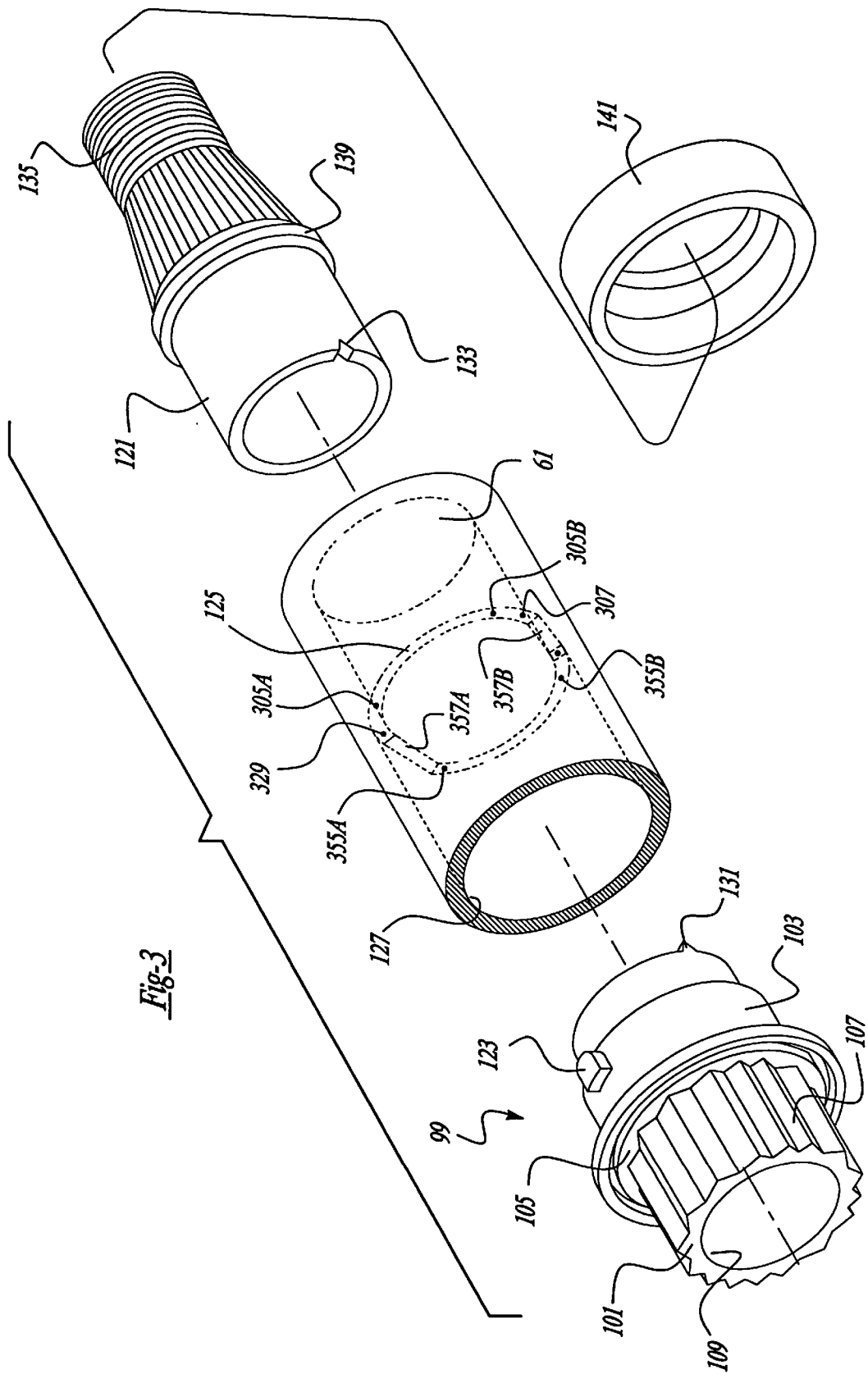
FIG. 3 is an exploded perspective view showing a clutch mechanism of the first preferred embodiment multi-functional apparatus of the present invention.
Figure 5:
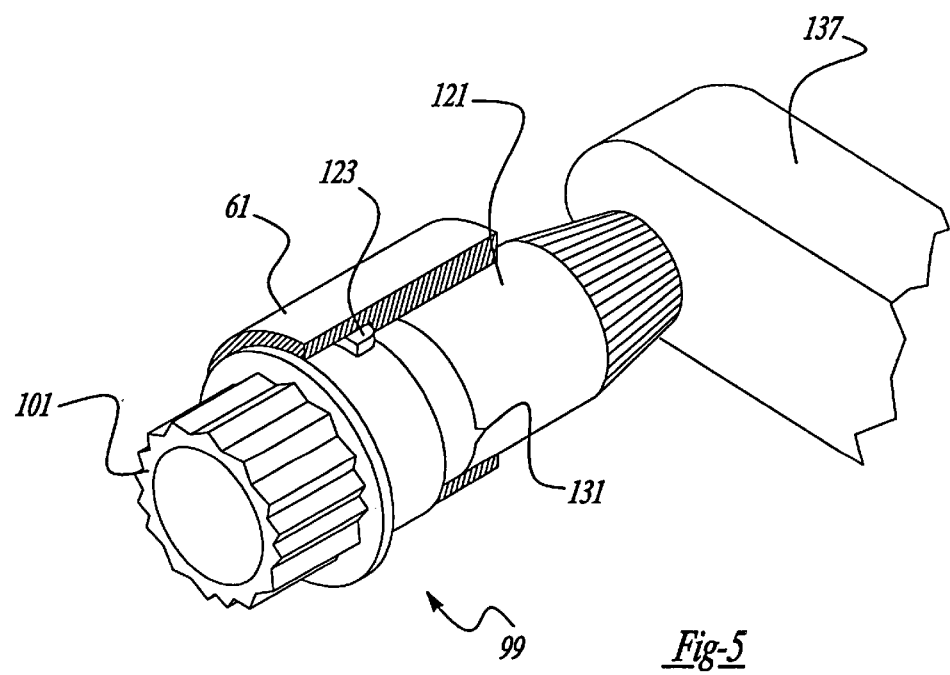
FIG. 5 is a fragmentary perspective view showing the clutch mechanism of the first preferred embodiment of the present invention multi-functional apparatus in an engaged position.
Figure 6:
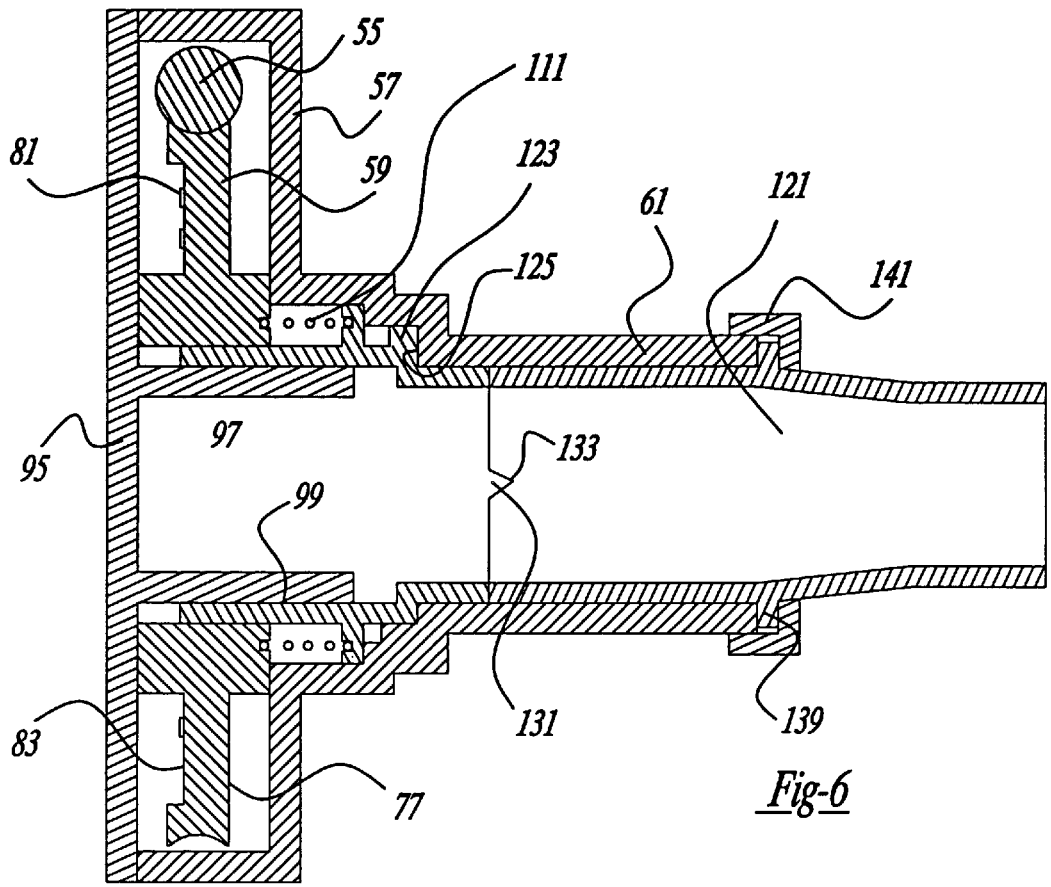
FIG. 6 is a sectional view, taken along line 6—6 of FIG. 4, showing the first preferred embodiment multi-functional apparatus of the present invention with the clutch mechanism in an engaged position.
Figure 7:
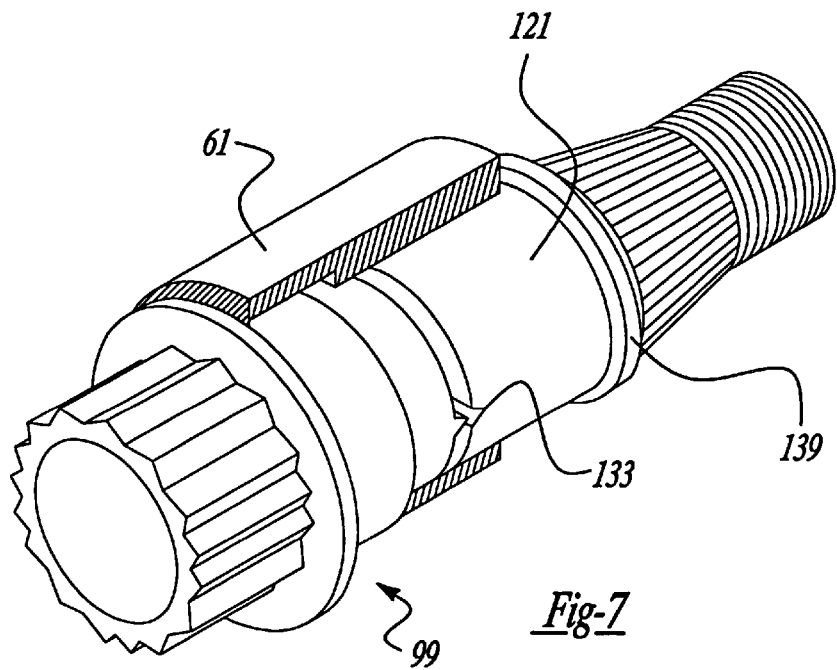
FIG. 7 is a fragmentary perspective view showing the clutch mechanism of the first preferred embodiment multi-functional apparatus of the present invention in a disengaged position.
Figure 8:
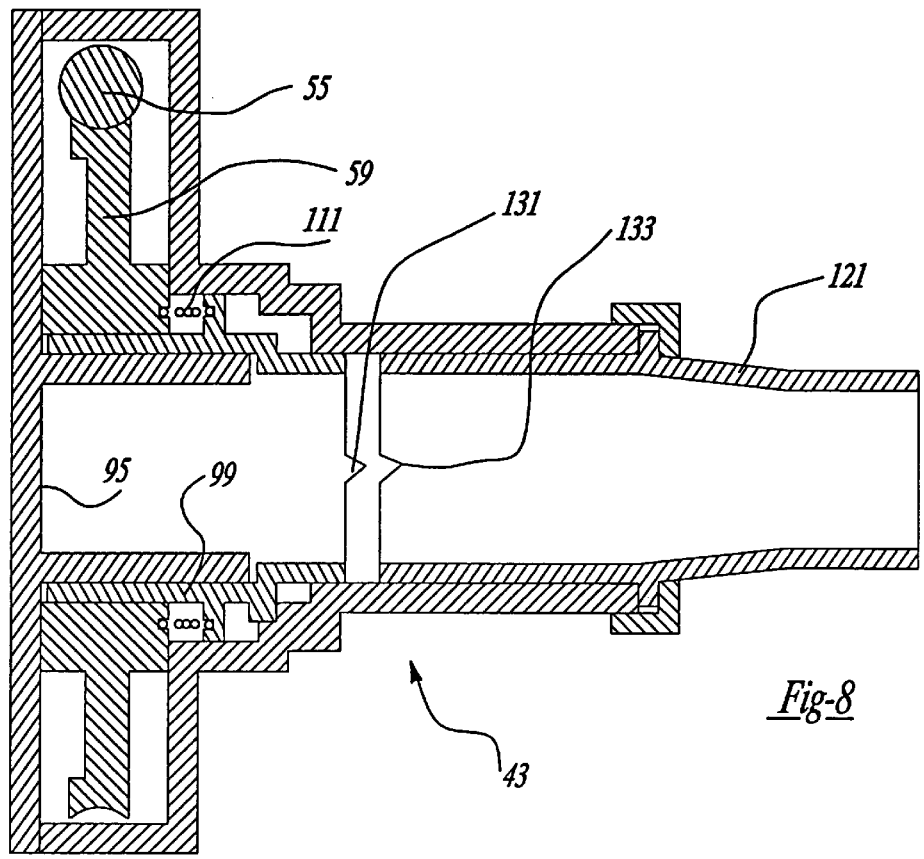
FIG. 8 is a sectional view, similar to that of FIG. 6, showing the first preferred embodiment of the present invention multi-functional apparatus with the clutch mechanism in a disengaged position.
Figure 9:
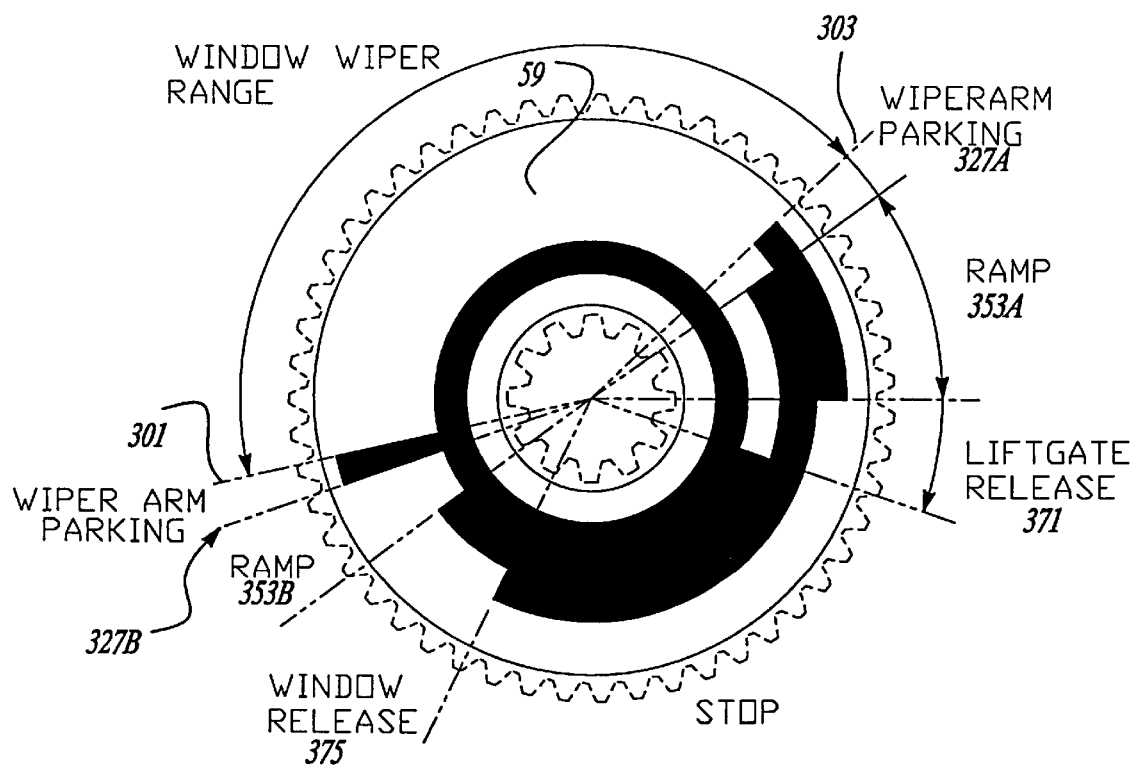
FIG. 9 is a diagram showing positional ranges of the main gear of the first preferred embodiment multi-functional apparatus of the present invention.
Figure 14:
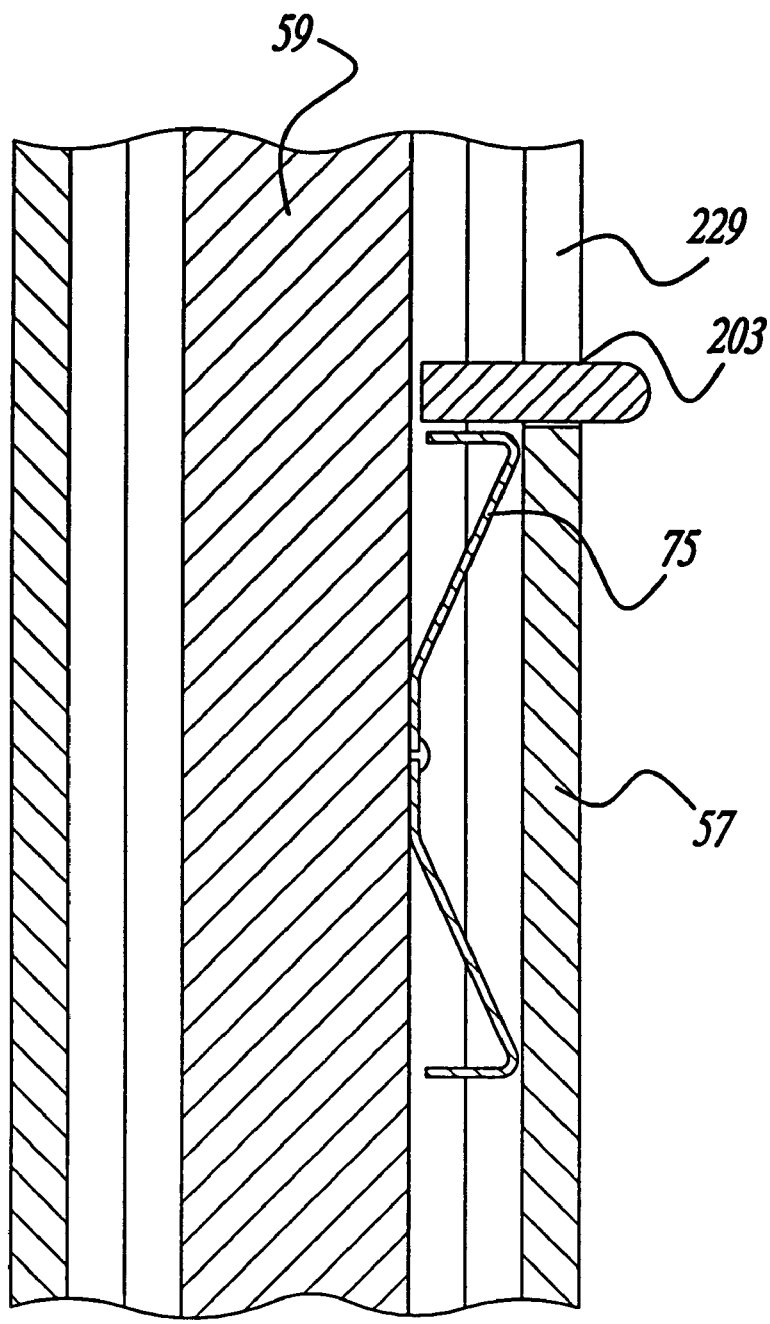
FIG. 14 is an enlarged, fragmentary sectional view, taken along line 14—14 of FIG. 10, showing the first preferred embodiment multi-functional apparatus of the present invention.

The operation of the clutch mechanism employed with the present invention can best be understood by referring to FIGS. 2, 3, and 5 through 9. When a rear window wiper switch is set in an operational mode, motor 51 causes spring tab 75 and helical gear 59 to oscillate or reciprocate within a wiper positional range defined between points 301 and 303 (FIG. 9). Concurrently therewith, cam follower 123 of actuator shaft 99 rides along camming surface 125 (FIG. 3). During this cyclical oscillating wiper operation, fingers 131 of actuator shaft 99 are fully engaged with receptacles 133 in wiper shaft 121 as is shown in FIGS. 5 and 6. Accordingly, wiper arm 137 and wiper shaft 121 rotate in unison in conjunction with actuator shaft 99 and helical gear 59. An electronic control unit 321 measures the rotation of helical gear 59 through feedback disk 81 acting in conjunction with four electrical contactors 323 riding therealong. When wiper arm 137 and feedback disk 81 reach the end of the wipe path at point 301, electronic control unit 321 actuates a normally closed relay 325 (see FIG. 17), arranged in an H-bridge configuration, to reverse the polarity and rotational direction of the armature within motor 51.

When the rear wiper switch is turned to an off setting, the electronic control unit 321 instructs motor 51 to rotate helical gear 59 to a wiper arm parking position 327A or 327B depending on the direction of the wiper arm when the switch is turned off. This causes cam follower 123 to return to camming surface position 305A or 305B and then on to parking position 329 or 307. Thus, the wiper assembly is moved off of rear window 33 (see FIG. 1) and onto a holding bracket on liftgate door 31 (also see FIG. 1) designated as wiper blade park/depressed position 331A or 331B. This allows for movement of rear window 33 (see FIG. 1) without interference of the wiper assembly.

When a liftgate release switch is activated, electronic control unit 321 rotates helical gear 59 along a ramp positional range 353A whereby cam follower 123 of actuator shaft 99 is moved from position 329 to position 355A along a ramped incline 357A of camming surface 125. When a window release switch is activated, electronic control unit 321 rotates gear 59 along a ramp positional range 353B whereby cam follower 123 of actuator shaft 99 is moved from position 307 to position 355B along a ramped incline 357B of camming surface 125. Thus, the clutch mechanism causes fingers 131 of actuator shaft 99 to disengage from receptacles 133 of wiper shaft 121 as is shown in FIGS. 7 and 8.

Referring now to FIGS. 1–3, 9–15 and 18, if the liftgate lock switch is activated, then electronic control unit 321 causes motor 51 to rotate helical gear 59 and spring tab 75 through its selected positional ranges. If a liftgate mounted window release push button switch 603 (see FIG. 17) is activated, electronic control unit 321 energizes motor 51 through leads 601 (also see FIG. 17). This causes spring tab 75 on helical gear 59 to rotate through window release positional range 375. Accordingly, spring tab 75 directly contacts against and pushes leading end 203 away from its nominal position, as shown in FIG. 4, along slot 205. This causes connecting rod 211 and window latch 47 to achieve an unlocked or released orientation. Pneumatic cylinders 35 thereby upwardly pivot and open rear window 33. Window linkage 221, connecting rod 211 and window latch 47 are spring biased to return to their nominal locked positions. In the alternative, window linkage 221 could also be integrated as part of connecting rod 211.

If the liftgate release switch is activated, electronic control unit 321 energizes motor 51 through the leads 601 in reverse polarity to the prior discussed window release function. This causes spring tab 75 of helical gear 59 to rotate through liftgate release positional range 371. Accordingly, spring tab 75 directly contacts against and pushes leading end 203A away from its normal position, as shown in FIG. 4 along slot 205A. This causes connecting rod 225 and liftgate release mechanism to achieve an unlocked or released orientation. Liftgate linkage 201A, connecting rod 225 and liftgate release mechanism are spring-biased to return to their normal locked positions. In the alternative, liftgate linkage 201A would also be integrated as part of connecting rod 225. Also, spring tab 75 can be replaced by an integrally molded interface protrusion extending from the worm gear.

Figure 18:
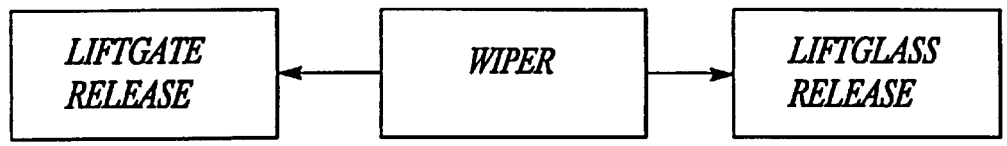
FIG. 18 is a flow chart showing a sequence of operation of the first preferred embodiment multi-functional apparatus of the present invention.
Figure 19:
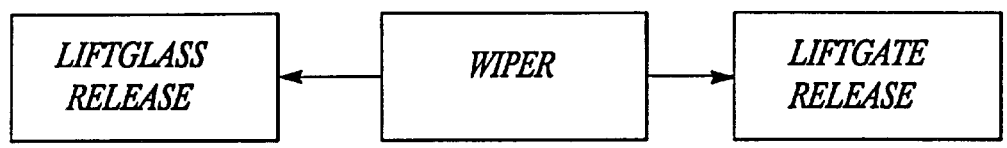
FIG. 19 is a flow chart showing a sequence of operation of a first alternate embodiment multi-functional apparatus of the present invention.
Figure 20:
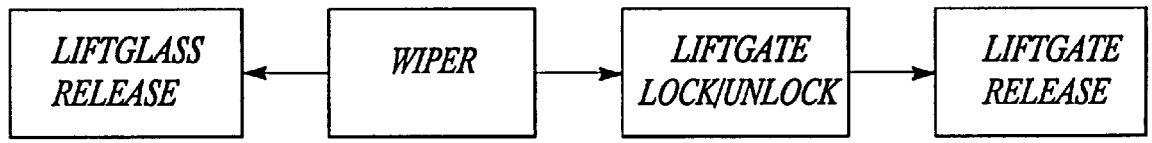
FIG. 20 is a flow chart showing a sequence of operation of a second alternate embodiment multi-functional apparatus of the present invention.

Referring to FIGS. 9 and 18, the electric motor selectively rotates main helical gear 59 from a liftgate release positional range to a window wiper positional range to a subsequent liftglass release positional range, although helical gear 59 can rotate in either direction to access either of the adjacent release functions individually. The reverse sequential motion is alternately shown in FIG. 19. Yet another alternate sequence of operation is illustrated in FIG. 20 wherein helical gear 59 is selectively rotated in a first direction from the wiper positional range to the liftglass positional range or reversed to move from the wiper positional range to a liftgate lock/unlock positional range and then to a liftgate release positional range. It will be appreciated that the previously discussed positional ranges may have alternate patterns and arrangements, and may include additional or replacement functions.

Figure 17A:
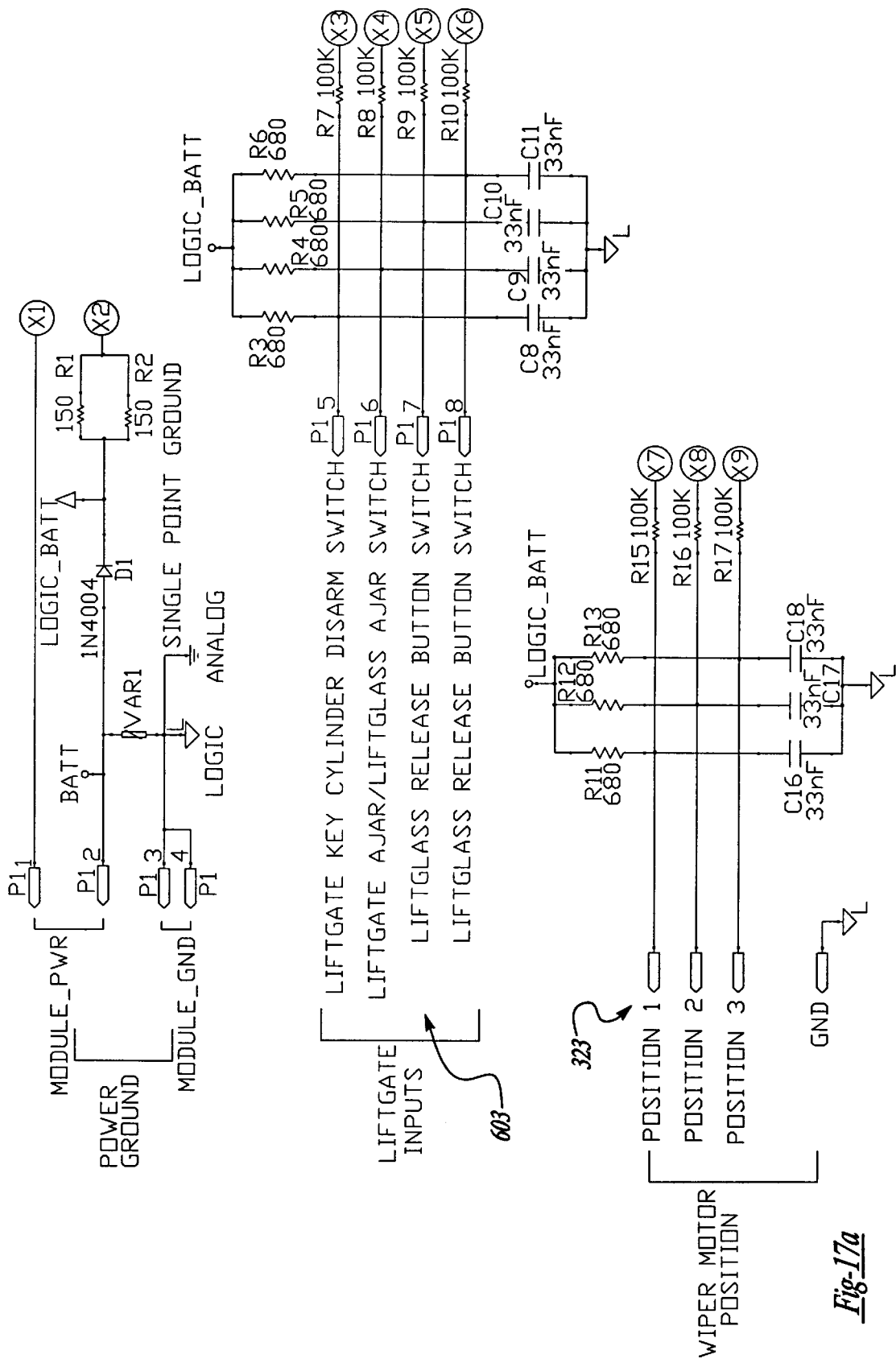
Figure 17B:
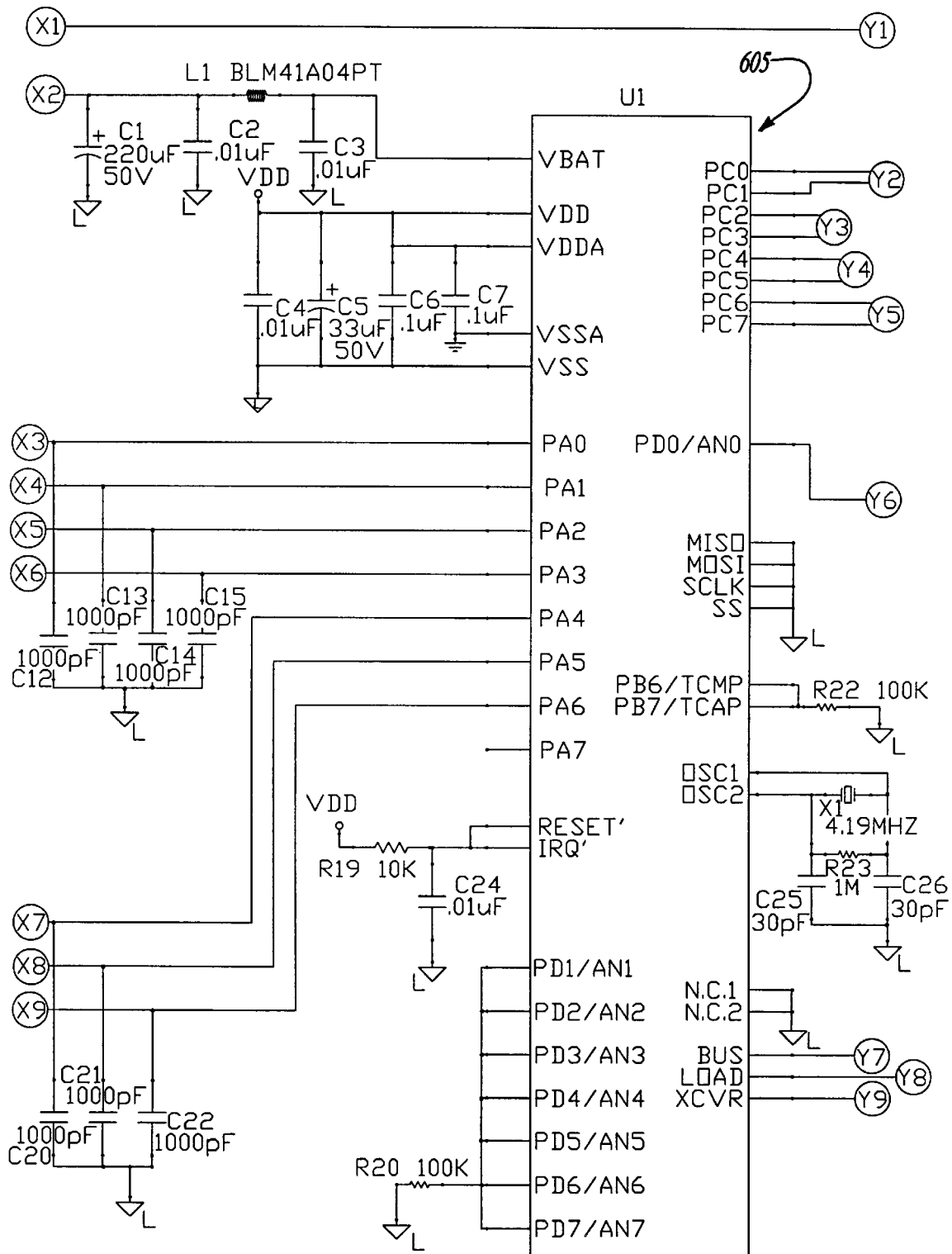

As can best be observed in FIGS. 2 and 17, electronic control module includes a rear node microprocessor 605 preferably using a Motorola MC68HCO5V6 (or alternately MC68HCO5V7) chip mounted upon a rigid printed circuit board 401. Rear node electronic control unit 321 is electrically connected to a central body computer (not shown) in a multiplexed (MUX) fashion through a wire harness 403. A J1850 MUX protocol is used. An electronic control module cover 421 secures electronic control unit 321 within electronic control module housing 91.

Figure 15:
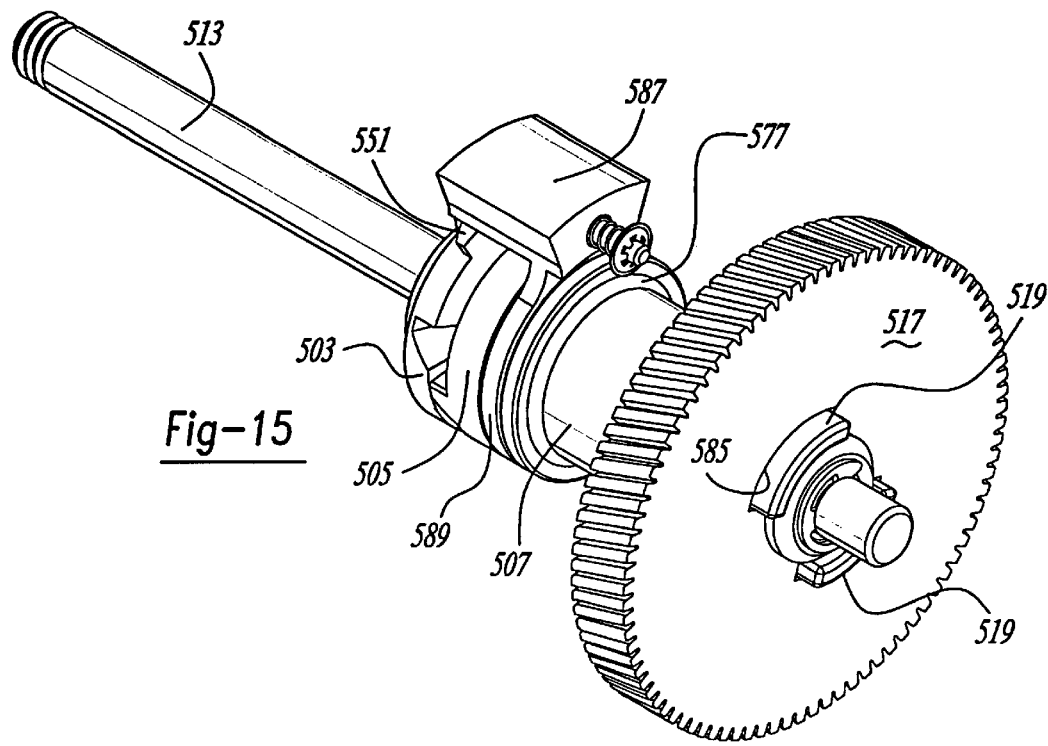
FIG. 15 is a front perspective view showing a clutch of a second preferred embodiment multi-functional apparatus of the present invention, in a disengaged position.
Figure 16:
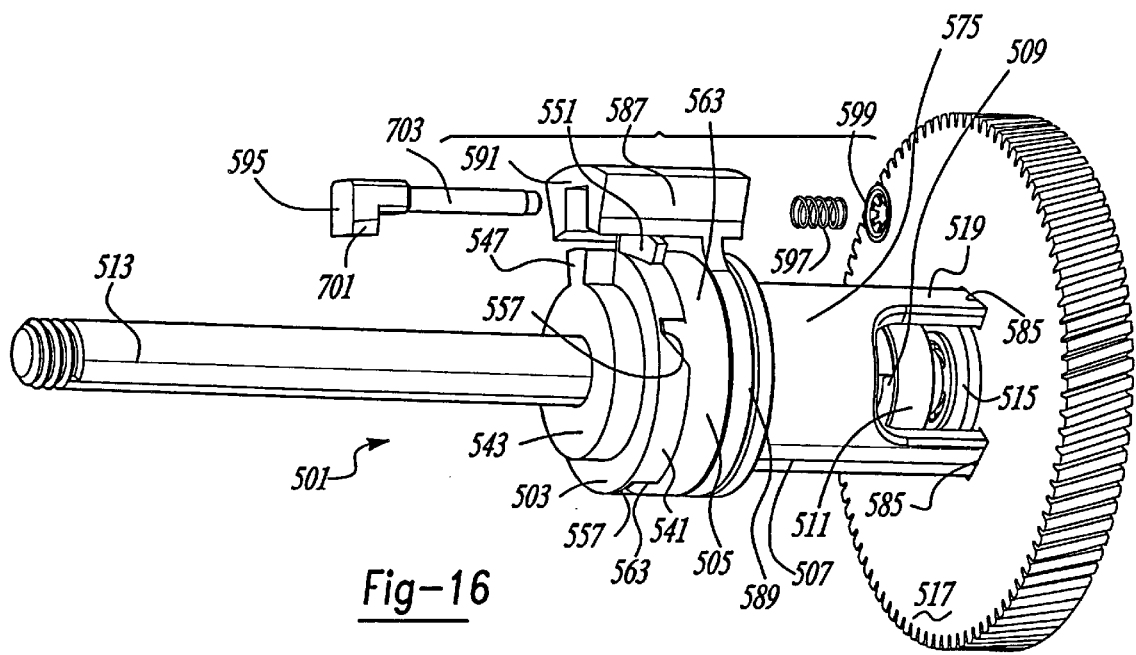
FIG. 16 is a partially exploded rear perspective view showing the clutch of the second preferred embodiment of the present invention multi-functional apparatus in an engaged position.

A second and somewhat more preferred embodiment of the clutch employed in the multi-functional apparatus of the present invention is shown in FIGS. 15 and 16. A first intermittent motion mechanism 501 includes a cam follower disk 503, a cam disk 505, a driving sleeve 507, a helically wound compression spring 509 and a spring retainer 511, all of which generally surround a wiper shaft 513. An annular bushing segment 515 of a main worm gear 517 coaxially surrounds a proximal end of a wiper shaft 513 and rotatably supports wiper shaft 513 concentrically with gear 517 and a bifurcated end 519 of driving sleeve 507. A pair of lock or snap rings are longitudinally positioned on either side of bushing segment 515 for maintaining the positional relationship of wiper shaft 513 relative to gear 517 and the adjacent gear housing cover. A cylindrical pin is positioned through a transverse bore in wiper shaft 513. The pin serves to longitudinally secure spring retainer 511 relative to wiper shaft 513.

Cam follower disk 503 has a pair of stepped annular structures 541 and 543 with a central common aperture pressfit or otherwise rotationally secured upon wiper shaft 513. A motion limiting primary tab 547 transversely depends from structure 543 and is defined by a pair of flat walls perpendicularly extending in a longitudinal direction from structure 541. A supplemental locking tab 551 peripherally depends from structure 541. A wedge surface of tab 551 defines a lock moving ramp which allows rotation of the wiper shaft past a lock for subsequent engagement. An opposite abutting wall is also provided on secondary tab 551 and is generally coplanar with wall 549 of primary tab 547. The abutting wall acts as the park position locking surface.

Three finger receptacles 557 are recessed into a backside of cam follower disk 503. Three fingers 563 are engagable within finger receptacles 557. The fingers and receptacles are not equidistant from each other and they have different sizes, in order to allow engagement of cam 505 with cam follower 503 in only one rotational position. A backface of cam disk 505 further has a longitudinal depression intersecting a central aperture. These fingers and recesses must be configured to allow bi-direction declutching.

Driving sleeve 507 has a hollow, circular-cylindrical shaped body 575 which receives compression spring 509, spring retainer 511 and bushing 515. An annular shoulder 577 is disposed on said body 575 longitudinally opposite from bifurcated end 519. A circular aperture longitudinally extends through shoulder 577 with clearance around wiper shaft 513. Compression spring 509 is operably compressed between an inside surface of shoulder 577 and spring retainer 511. Tongues are symmetrically disposed on either side of the aperture and longitudinally depend from shoulder 577. Tongues engage with the groove of cam disk 505 so as to rotate cam 505 in concert with rotation of driving sleeve 507. Bifurcated end 519 of driving sleeve 507 fits within a pair of arcuate slots 585 of gear 517. Accordingly, when the electric motor is selectively energized, an armature and worm gear segment will rotate gear 517 a predetermined angular or rotational amount and thereby concurrently rotating driving sleeve 507 and cam disk 505.

A locking sleeve 587 has a ring segment 589 and a lock housing segment 591. Ring segment 589 concentrically surrounds wiper shaft 513 and is longitudinally trapped for movement between cam disk 505 and driving sleeve 507. Lock housing segment 591 mates with a transversely offset cavity of cover in a keyhole-like manner such that lock sleeve 587 is prevented from rotation but is allowed to longitudinally move in a linear manner. A lock 595 is movably disposed in lock housing segment 591. A helically wound compression spring or resilient member 597 is compressed between a metallic push nut 599, having a set of inwardly projecting and angled fingers, and a facing surface of lock housing segment 591. Spring 597 serves to linearly and longitudinally bias lock 595 relative to locking sleeve 587 when lock 595 rides against supplemental tab 551. Lock 595 is further defined by a head 701 and a circular-cylindrical pedestal 703.

The operation of first intermittent motion mechanism 501 of the present embodiment can best be understood as follows. First intermittent motion mechanism 501 essentially acts as a clutch in selectively engaging and disengaging wiper shaft 513 from gear 517. The fingers of cam disk 505 are fully engaged within the finger receptacles of cam follower disk 541 when the electric motor has been energized to rotate gear 517 within a window wiping positional range and between the window wiping positional range and the initial park position. In this engaged clutch position, spring 509 biases driving sleeve 507, locking sleeve 587 and cam disk 505 away from gear 517 such that cam follower disk 503 and wiper shaft 513 will rotate and oscillate concurrent with rotation and oscillation of gear 517.

In the clutch disengaged position, the flat wall of the cam follower disk primary tab 547 abuts against a wiping range stop of the cover, such that cam follower disk 503 and wiper shaft 513 are prevented from further rotation. However, the electric motor selectively further continues the rotation of gear 517 along the rotational direction thereby causing coincidental rotation of driving sleeve 507 and cam disk 505. This continued rotational movement causes the inclining surface of each cam disk finger to longitudinally push cam disk 505, lock sleeve 587 and driving sleeve 507 toward gear 517. This also serves to compress spring 509. Bifurcated end 519 of driving sleeve 507 passes through gear 517 in this state. Thus, cam follower disk 503 and cam disk 505 are effectively separated. Gear 517 can further rotate to various other positional ranges as previously discussed while wiper shaft 513 remains in a park position.

The clutch disengaged movement further serves to lock or pin wiper shaft 513 in the park position by abutting head 701 of lock 595 against the abutting wall of secondary locking tab 551. Gear 517, driving sleeve 507 and cam disk 505 are further rotated to an initial park position after the clutch is disengaged. Lock 595 is released from tab 551 when the rotational direction of gear 517 is reversed back past through the park position so that cam disk 505 reengages with cam follower disk 503 for concerted movement. This causes head 701 of lock 595 to longitudinally move free of tab 551. The disks, sleeves, lock and gears are all injection molded from an engineering grade polymeric material such as Delrin, while the wiper housing is cast or machined from Aluminum and the wiper shaft is steel.

A rotating slotted cam, Geneva gear or starwheel intermittent motion mechanism can also be employed to selectively activate the wiper shaft in place of the disclosed split shaft clutch. For example, reference should be made to U.S. Ser. No. 08/430,388 entitled "Multi-Functional Apparatus Employing An Intermittent Motion Mechanism" which was invented by W. Zimmer et al., and is incorporated by reference herein.

While various embodiments of the present invention have been described, it will be appreciated that various modifications can be made. For example, the electric motor may alternately be an electromagnet, solenoid or other electromagnetic device. It is further envisioned that other actuating devices beyond those disclosed may be coupled to the disclosed intermittent motion mechanisms. Additional gears and linkages may also be employed between the intermittent motion mechanisms and the actuated devices or between the electric motor and the driving member, preferably disclosed herein as a helical main gear. Additionally, other mechanical lock configurations can be employed to pin the wiper in its park position during operation of the other actuating devices. Various materials have been disclosed in an exemplary fashion, however, other materials may of course be employed. It is intended by the following claims to cover these and any other departures from the disclosed embodiments which fall within the true spirit of this invention.

The invention claimed is:
1. A multi-functional apparatus for use in an automotive vehicle, said apparatus comprising:
   a window wiper shaft;
   a first release latch linkage movable between a latched position and unlatched position;
   a second release latch linkage movable between a latched position and an unlatched position;
   a movable member selectively driving said window wiper shaft, said first release latch linkage and said second release latch linkage; and
   a single electromagnetic device operably moving said movable member in a first direction from a wiper positional range to a liftglass release positional range thereby deactivating said wiper shaft and activating said first release latch linkage, said electromagnetic device further reversing direction of said movable member to move said movable member from said wiper positional range to a door release positional range thereby deactivating said wiper shaft and activating said second release latch linkage.

2. The apparatus of claim 1 further comprising a first intermittent motion mechanism selectively coupling said first release latch linkage to said movable member.

3. The apparatus of claim 2 wherein said first intermittent motion mechanism is operably movable in a generally linear manner.

4. The apparatus of claim 2 further comprising a second intermittent motion mechanism selectively coupling said second release latch linkage to said movable member.

5. The apparatus of claim 4 wherein said second intermittent motion mechanism operably moves in a generally linear manner.

6. The apparatus of claim 1 further comprising an intermittent motion mechanism coupling said wiper shaft to said movable member.

7. The apparatus of claim 6 wherein said intermittent motion mechanism is a rotatable clutch and said movable member is a gear.

8. The apparatus of claim 7 further comprising at least two triangularly shaped fingers project from one surface of said clutch, and at least two receptacles selectively receiving said at least two fingers to provide engagement of said clutch thereby coupling movement of said wiper shaft to said gear.

9. The apparatus of claim 1 further comprising a rear door of said automotive vehicle having a window, said window being movable relative to said door upon movement of said first release latch linkage, said electromagnetic device being mounted upon said door.

10. A multi-functional apparatus for use in an automotive vehicle, said apparatus comprising:
    a window wiper shaft;
    a door release linkage movable between a latched position and unlatched position;
    a window release linkage movable between a latched position and an unlatched position;
    a rotatable member selectively driving said window wiper shaft and said release latch linkages; and p1 an electromagnetic device selectively moving said rotatable member in a first direction from a wiper positional range to a window release positional range, said electromagnetic device further selectively moving said rotatable member in an opposite second direction from said wiper positional range to a door lock/unlock positional range.

11. The apparatus of claim 10 further comprising an intermittent motion mechanism coupling said wiper shaft to said rotatable member.

12. The apparatus of claim 10 wherein said intermittent motion mechanism is a rotatable clutch and said rotatable member is a gear.

13. The apparatus of claim 10 wherein said rotatable member moves from said door lock/unlock positional range to a door release positional range after said rotatable member is moved from said wiper positional range to said door lock/unlock positional range.

14. A method of operating a multi-functional apparatus for use in an automotive vehicle having an electric motor and a main gear, said method comprising the steps of:
 (a) rotating said electric motor in a first direction to rotate said main gear in a first direction;
 (b) moving said main gear from a wiper positional range to a door release positional range in response to step (a);
 (c) rotating said electric motor in a second direction to rotate said main gear in a second direction; and
 (d) moving said main gear from said wiper positional range to a window release positional range in response to step (c).

15. The method of claim 14 further comprising the steps of:
 (a) moving a rear liftgate door release latch when said main gear moves from said wiper positional range to said door release positional range; and
 (b) allowing a portion of a rear window to move relative to said liftgate door when said main gear moves from said wiper positional range to said window release positional range.

16. The method of claim 14 further comprising the step of selectively disengaging a window wiper shaft from said main gear when said main gear moves from said wiper positional range to either of said release positional ranges.

* * * * *